United States Patent [19]

Aoki et al.

[11] Patent Number: 5,672,441
[45] Date of Patent: Sep. 30, 1997

[54] BATTERY DEVICE AND DRIVING DEVICE FOR BATTERY DEVICE

[75] Inventors: Hisashi Aoki, Aichi; Hidero Mitsui, Kanagawa; Yasushi Noda, Tokyo, all of Japan

[73] Assignee: Sony Corporation, Japan

[21] Appl. No.: 521,758

[22] Filed: Aug. 31, 1995

[30] Foreign Application Priority Data

Sep. 2, 1994 [JP] Japan .................................... 6-210211

[51] Int. Cl.⁶ ........................................................ H01M 2/10
[52] U.S. Cl. ............................. 429/97; 429/99; 429/123
[58] Field of Search ............................. 429/96, 97, 99, 429/123

[56] References Cited

U.S. PATENT DOCUMENTS 4,943,498  7/1990  Cooper et al. ..................... 429/123 X
5,399,446  3/1995  Takahashi ............................ 429/97 X
5,437,938  8/1995  Mitsui et al. ....................... 429/123 X
5,506,749  4/1996  Matsuda ............................... 429/99 X

FOREIGN PATENT DOCUMENTS 0 559 573 A1  9/1993  European Pat. Off. .
0 572 327 A1  12/1993  European Pat. Off. .

*Primary Examiner*—Stephen Kalafut
*Attorney, Agent, or Firm*—Ronald P. Kananen

[57] ABSTRACT

A battery device that prevents mistaken connection to a main apparatus includes a casing which houses a battery. The casing has a loading surface section on a lateral surface of its outer periphery. The loading surface section corresponds to a setting surface section of a main apparatus. The loading surface section of the casing has a discrimination groove having an opening end opened on an abutment surface and extending from the opening end parallel to the loading direction on the main apparatus. The abutment surface is formed on the loading surface of the casing for extending in a direction at right angles to the loading surface section.

10 Claims, 11 Drawing Sheets

BATTERY DEVICE AND DRIVING DEVICE FOR BATTERY DEVICE

FIELD OF THE INVENTION

This invention relates to a battery device having enclosed therein a rechargeable cell or a dry cell, and a loading device upon which the battery device is seated, such as a portable electronic apparatus which employs the battery device as a power source.

BACKGROUND OF THE INVENTION

A portable electronic apparatus, such as a portable video tape recorder, a tape player, a video camera or a disc player, is generally designed so that a dc power source, such as a rechargeable cell or a dry cell, may be used as a power source in addition to a commercial power source supplied via a dc conversion adapter.

Consequently, in these electronic devices, a battery loading unit is built into a portion of a casing of the electronic device, and a battery device, having enclosed therein a rechargeable cell or a dry cell, is connected to the battery loading unit. When the charge of the cell in the battery device has become depleted, the battery device is loaded on a battery loading unit provided on a charger having a dc conversion adapter.

A conventional battery device 51 is explained with reference to FIGS. 13 and 14. The battery device 51 is roughly made up of a casing 51A having a battery housing unit therein, a rechargeable cell (not shown), housed within the battery housing unit, and a pair of terminals 48A, 48B connected to the rechargeable cell.

The casing 51A has a substantially rectangular loading surface section 51B, and two substantially columnar-shaped chargeable cells that are housed within the battery housing unit. In the loading surface section 51B, a mounting recess 40 is formed in parallel with the loading direction so as to be opened at its one end on an abutment surface extending an right angles to the loading surface section.

In the mounting recess 40, a charging discriminating member 41 which indicates the charging state is movably mounted. The charging discriminating member 41 is moved along the mounting recess 40 for indicating, depending on the position to which the discriminating member has been moved, whether the rechargeable cell housed within the housing unit is charged or yet to be charged.

The loading surface section 51B has a substantially rectangular-shaped recess 43 at a position coincident with the centerline of the mounting recess 40. At a mid-position of the surface section, substantially coincident with the recess 43, is formed a substantially rectangular loading guide recess 44. In addition, a substantially rectangular loading and holding recess 45 is disposed in such a way that its centerline is coincident with the loading guide recess 44.

The casing 51A has substantially L-shaped first and second guide recesses 46A, 46B in series with each other along a lateral surface thereof parallel to the loading direction. The casing 51A also has a third guide groove 46C and a fourth guide groove 46D in a lateral surface thereof opposite to the lateral surface carrying the first and second guide grooves so that the third and fourth guide grooves face the first and second guide grooves, respectively as shown in FIG. 14.

Referring to FIG. 14, a main apparatus 52 on which the above-described battery device is loaded is now explained.

The main apparatus 52 includes a casing 52A having a setting surface section 52B for loading the battery device 51 thereon, and connection terminals 49A, 49B connected to terminals 48A, 48B of the battery device 51.

The casing 52A has a substantially rectangular operating boss 58 having its one end integrally connected to an abutment surface 52E extending at right angles to the setting surface section 52B. The setting surface section 52B has a substantially rectangular opening 53 at a position coincident with the centerline of the operating boss 58, and a substantially rectangular engagement portion 54 integrally formed to extend from a lateral surface of the opening 53. The engagement portion 54 is resiliently flexible about its proximal point and has an engagement boss 54A at its distal end.

In the setting surface section 52B a loading guide section 55 is intergrally formed in the form of a substantially elliptical pillar. The setting surface section 52B has a substantially rectangular opening 56 at a position coincident with the centerline of the loading guide section 55 and a substantially rectangular loading holding section 57 is integrally protruded from a lateral side of the opening 56. The loading holding section 57 is resiliently flexible about the proximal point, and has a loading holding protrusion 57A integrally formed at its distal end.

The casing 52A has a pair of guide wall sections 52C, 52D on both lateral sides parallel to the setting surface section 52B so that the guide wall sections are at right angles to the setting surface section 52B and parallel to the loading direction. On the inner wall section of the guide wall section 52C, substantially L-shaped first and second guide protrusions 47A and 47B are formed.

On the inner wall section of the guide wall section 52D of the casing 52A, opposite to the guide wall section 52C having the first and second guide protrusions 47A and 47B, a third guide wall protrusion 47C and a fourth guide protrusion 47D facing the first guide protrusion 47A and the second guide protrusion 47B, respectively are intergrally formed.

On both lateral end portions of the abutment surface 52E extending at right angles to the setting surface section 52B first and second connection terminals 49A and 49B, are formed. These first and second connectable terminals 49A and 49B are connected to a dc conversion unit (not shown).

The first and second connection terminals 49A and 49B are protected by a protection member 50 having a substantially U-shaped cross-section. The protection member 50 is mounted for movement in the loading direction. The protection member has its resilient member (not shown) resiliently flexed so as to be moved towards the abutment surface 52E for protruding the first connection terminal 49A and the second connection terminal 49B away from the protection member 50.

The operation of loading the battery device 51 on the main apparatus 52 and the operation of the charging discriminating member 41 provided on the battery device 51 are now explained. First, the first to fourth guide protrusions 47A to 47D formed on the inner wall surfaces of the guide wall sections 52C, 52D of the setting surface section 52B of the main apparatus are caused to bear against the first to fourth guide grooves 46A to 46D formed in the battery device 51.

As the battery device 51 is moved along the loading direction, the first to fourth guide protrusions 47A to 47D protuberantly formed on the guide wall sections 52C, 52D of the main apparatus 52 are moved along the first to fourth guide grooves 46A to 46D formed in the battery device 51 until being abutted against the ends of the firth to fourth guide grooves 46A to 46D. The battery device 51 is retained in this manner by the main apparatus 52.

When the battery device 51 is moved along the loading direction, the loading guide section 55 formed on the setting surface section 52B of the main apparatus 52 is introduced into the loading guide recess 44 formed in the loading surface section 51B. The loading guide section 55 is moved along the loading guide section 55. The battery device 51 is retained by the main apparatus 52 by the loading guide section 55 being abutted against the one end of the loading guide recess 44.

As the battery device 51 is further moved along the loading direction, the loading holding section 57 protuberantly formed on the loading surface section 52B of the main apparatus 52 is resiliently flexed in the loading holding guide recess 45 formed in the loading surface section 51A. The battery device 51 is retained in this manner by the loading and holding protrusion 57A being engaged in the loading and holding recess 45.

When the battery device 51 is further moved along the loading direction of the main apparatus 52, the actuating protrusion 58 protuberantly formed on the setting surface section 52B of main apparatus 52 is caused to bear against the end of the charging discriminating member 41 movably mounted in the mounting recess 40 of the loading surface section 51B. Consequently, when the battery device 51 is moved in this manner along the loading direction, the charging discriminating member 41 is thrust by the actuating protrusion 58. As the battery device 51 loaded on the main apparatus 52 is pulled out in a direction opposite to the loading direction, the loading holding section 57 is resiliently deflected by one end of the loading holding recess 45 for disengaging the loading and holding protrusion 57A from the loading and holding recess 45.

As the battery device 51 provided on the main apparatus 52 is pulled out in a direction opposite to the loading direction, the engagement protrusion 58 formed integrally on the setting surface section 52E of the main apparatus is engaged in a cut-out groove 41A formed in the charging discriminating member 41 movably mounted in the mounting recess 40 of the loading surface section 51A. Consequently, as the battery device 51 is moved in the direction opposite to the loading direction, the charging discrimination member 41 is pulled out by the engagement protrusion 58.

The battery device 51 is occasionally designed as a high capacity battery device having two stages of the battery devices in order to permit the electronic apparatus to be employed for a longer time interval. With such battery device, two rechargeable cells are housed in a side-by-side relation to each other.

Heretofore, the usual battery device and the high capacity battery device are designed to have a common structure as to, for example, the shape of the loading surface section for the electronic apparatus, so that the usual battery device or the high capacity battery device may be interchangeably loaded on the electronic apparatus.

However, certain electronic devices cannot be used except with the high capacity battery device. The electronic device having the high capacity battery device connected thereto can be used for a longer time. In addition, some of the electronic device need to be used for prolonged time in order to be used conveniently. For example, some of the portable video cameras are designed so that the usual battery device cannot be connected thereto in order to assure continuous photographing.

That is, if the usual battery device is provided on the portable video camera for prolonged photographing, the video camera operation may cease thereby interrupting photographing, necessitating the burdensome requirement that the consumed battery device be charged and exchanged frequently. Consequently, with some of the electronic apparatus, it is necessary to discriminate the usual battery device and the high capacity battery device from each other to permit the battery device suitable to the operating conditions of the electronic apparatus to be powered with the battery device.

Referring to FIGS. 13 and 14, the loading device for discriminating the usual battery device from the high capacity battery device is now explained. The usual battery device 51 in the present battery loading device has a discrimination recess 53 on its lateral surface parallel to the loading direction of the loading surface section, as shown in FIG. 13. On the other hand, the main apparatus 52 has an operating member 54B on an inner wall surface of the guide wall section 52C, as shown in FIG. 14.

The present loading device utilizes a push-pull switch, that is, a switch which is turned on when the operating member 54 is moved by a force and which is turned off when the force is removed. Such a push-pull switch is provided on the inner wall of one of the guide wall sections 52C of the main apparatus 52.

With the loading device for the battery device, when the battery device 51 is inserted on the setting surface section 52B, the operating member 54B provided on the main apparatus 52 is moved by the lateral surface of the battery device 51. When moved to a position of the discriminating recess 53 formed in the battery device 51, the operating member 54B is protrudes so as to produce a detection sound or turn on a detection light for apprising the user that the battery device 51 has been detected.

With the above-described slot-in type loading device for the battery device, in which a bottomed box-shaped loading section is provided in the main apparatus and the battery device is inserted via an aperture formed on one lateral side of the loading device until it is housed therein in its entirety, the operating member 54B is repeatedly changed on and off in the course of loading of the battery device. Thus, the loading device for the battery device has a defect in that the circuit of the operating member 54B may be adversely affected by such repeated and frequent changeover operations of the operating member 54B. This may result in an increased likelihood of a failure in detection.

On the other hand, the loading device for the battery device detects the type of the battery device 51 loaded on the main apparatus 52 in a simple manner. It is not designed so that the main apparatus may prevent the loading of the battery device 51. That is, the type of battery device is determined after the battery device 51 has been fully loaded on the main apparatus 52. However, since the electronic apparatus needs to be protected against destruction, it is desirable to initially determine the type of battery device 51 when it is attempted to connect the battery device 51 with the main apparatus 52.

In addition, with the above-described loading device, the space for mounting the operating member 54B to detect the battery device 51 must be on the guide wall section 52C of the main apparatus 52. However, this loading device is not desirable for a portable electronic apparatus which requires a reduced size and thickness.

It is therefore an object of the present invention to provide a battery device with which it is possible to clearly and reliably determine the type of battery device in order to inhibit the mistaken loading of an incorrect battery type on the main apparatus, thereby preventing damage to the main apparatus. It is another object of the present invention to provide a loading device for a battery device which similarly provides a clear and reliable determination of a battery type in order to inhibit the mistaken loading of an incorrect battery on the main apparatus in order to prevent damage to the main apparatus.

SUMMARY OF THE INVENTION

For accomplishing the above objects, the battery device according to the present invention includes a casing having a battery housing unit therein and having a loading surface section on a lateral surface on the outer periphery thereof. The loading surface section is connected to a setting surface section of a main apparatus. The battery device also includes a battery housed within the battery housing unit. The loading surface section of the casing has a discrimination groove having an opening end opened on an abutment surface and extending from the opening end parallel to the loading direction on the main apparatus. The abutment surface is formed on the loading surface of the casing in a direction at right angles to the loading surface section.

The battery housing unit is formed by a spacing delimited by a continuous inner wall section having an arcuate cross-section for holding plural batteries each of a substantially columnar cross-section in a side-by-side relation. A discrimination groove is formed in the loading surface section in registration with a thickened portion of the inner wall section.

At least a pair of guide recesses are formed in both lateral surface sections of the casing extending at right angles to the loading surface section parallel to the loading direction at an outer periphery of the casing. The discrimination groove is located at a position offset relative to the centerline of the loading surface section and the beginning end of the guide recess is closer to the abutment surface than the terminal end of the discrimination groove.

The casing has terminals on both ends of a lateral surface provided with an opening end of the discrimination groove. The terminals are connected to the battery housed within the battery housing unit.

The mounting recesses include those disposed parallel to each other. A charging discrimination member is movably mounted facing the mounting recesses for indicating that the battery is in a non-charged state or in a charged state.

For accomplishing the above-mentioned objects, the loading device for the battery device according to the present invention has a battery device having a casing in which a battery housing unit is disposed. The battery device has a loading surface section on a lateral surface on the outer periphery thereof. The loading surface section is connectable to a setting surface section of a main apparatus, and a battery housed within the battery housing unit in the housing. The loading surface section of the casing has a discrimination groove having an opening end opened on an abutment surface and extending from the opening end parallel to the loading direction on the main apparatus. The abutment surface is formed on the loading surface of the casing in a direction at right angles to the loading surface section. The loading device also includes a main apparatus having a casing which, in turn, includes a setting surface section on a lateral side of its outer periphery for loading the battery device thereon. The casing also has a rib-shaped discrimination lug secured at one end to an abutment surface formed on the setting surface section at right angles to the setting surface. The discrimination lug is formed integrally with the setting surface section. The discrimination lug on the main apparatus is detachably engaged in the discrimination recess in the battery device. The battery device has at least a pair of guide recesses on its lateral surfaces extending at right angles to the loading surface section extending parallel to the loading direction. The discrimination groove is offset with respect to the centerline of the loading surface section. The beginning end of the guide recesses is closer to the abutment surface than the terminal end of the discrimination groove.

The battery device has a discrimination groove and a mounting recess parallel to each other, and a charging discrimination member movably mounted facing the mounting recess for indicating whether the battery is in the charged state or in the non-charged state. The main apparatus has an actuating portion at the proximal end of the discrimination protrusion for inwardly thrusting the charging discrimination member provided on the battery device. The charging discrimination member has a cut-out groove facing the setting surface section of the main apparatus. The main apparatus includes an engagement protrusion engaged in the cut-out groove formed in the charging discrimination member in alignment with the actuating portion.

With the above-described battery device according to the present invention, since the discrimination groove is formed at a position offset with respect to the centerline of the loading surface section, and the beginning end of the guide groove is located closer to the abutment surface than the terminal end of the discrimination groove, it becomes possible for the main apparatus to detect the discrimination groove at the initial loading position when the guide recess of the battery device is abutted against the main apparatus.

With the loading device for the battery device according to the present invention, since the discrimination groove is offset with respect to the centerline of the loading surface section of the battery device, and the beginning end of the guide groove is closer to the abutment surface than the terminal end of the discrimination groove, while the discrimination protrusion is offset with respect to the centerline of the setting surface section of the main apparatus, and the beginning end of the guide protrusion is closer to the abutment surface than the terminal end of the discrimination protrusion, the discrimination protrusion is inserted into the discrimination groove in the initial loading state in which the guide protrusion formed on the main apparatus is abutted against the guide groove formed in the battery device.

Consequently, with the present loading device for the battery device, if an appropriate battery device is loaded on the main apparatus, the battery becomes tilted by the discrimination protrusion of the main apparatus being caused to bear against the setting surface section of the battery device before completion of loading of the battery device. Thus, it is possible with the loading device to reject attempted loading of an inappropriate battery device on the main apparatus.

DETAILED DESCRIPTION OF THE PREFERRED EMBODIMENTS

Referring to FIGS. 1 to 12, and 16 to 18, preferred embodiments of the present invention will be explained in detail. The battery device 1 is basically the same in construction as the conventional battery device 51, and is comprised of a casing 1A having a battery housing unit 1B, a plurality of rechargeable cells 11 housed within the battery housing unit 1B and terminals 12A, 12B connected to the rechargeable cells 11.

Figure 1:
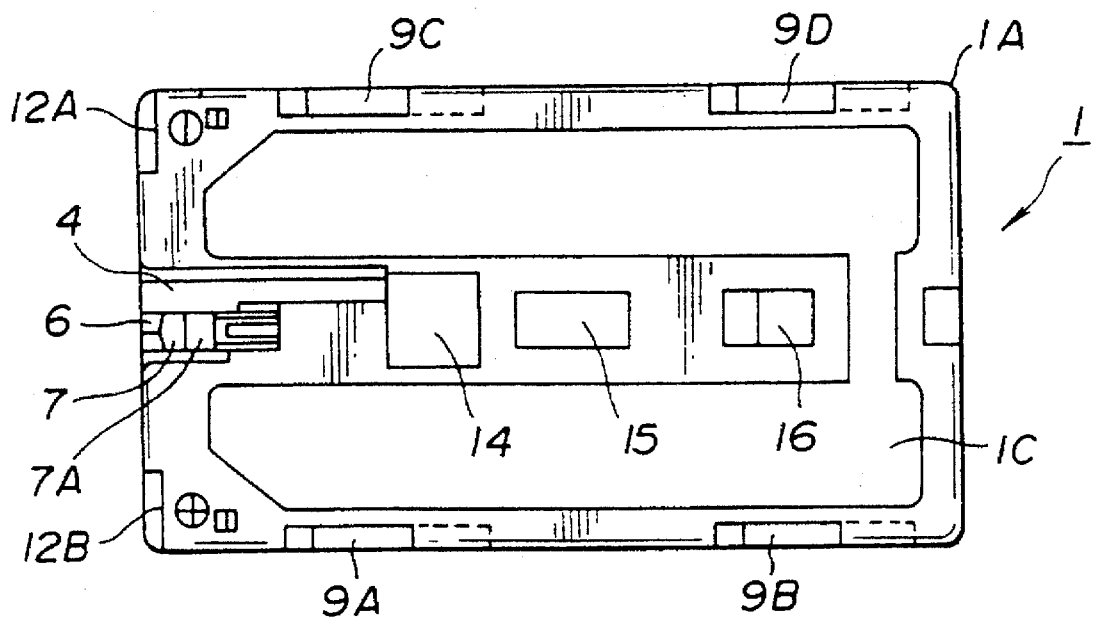
FIG. 1 is a plan view showing the loading surface section of a battery device according to an embodiment of the present invention.

The casing 1A has a substantially rectangular loading surface 1C at the peripheral bottom surface defining a substantially square-shaped battery housing unit 1B, as shown in FIG. 1. The battery housing unit 1B is delimited by an inner wall section having an arcuate cross-section for defining a space within which to hold substantially columnar-shaped rechargeable cells side-by-side. Within the battery housing unit 1B, two rows each comprised of two substantially columnar-shaped rechargeable cells are arranged side-by-side in two tiers.

Figure 2:
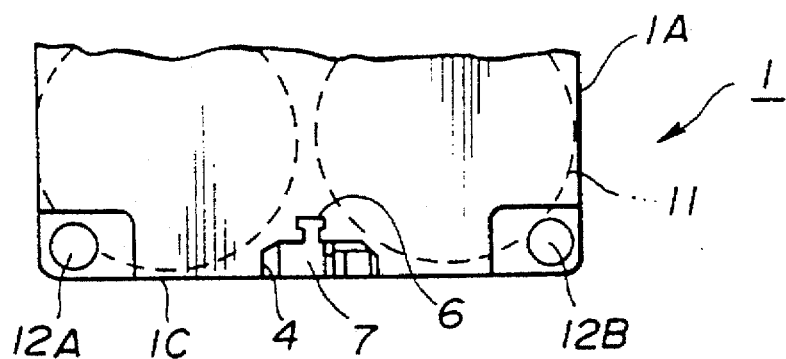
FIG. 2 is a front view showing the battery device shown in FIG. 1.

On the loading surface section 1C is formed a discriminating recess 4 having an opening end opened in an abutment surface extending at right angles to the loading surface section 1C in registration with a thickened portion of the inner wall section of the battery housing unit 1B, as shown in FIG. 2.

Figure 4:
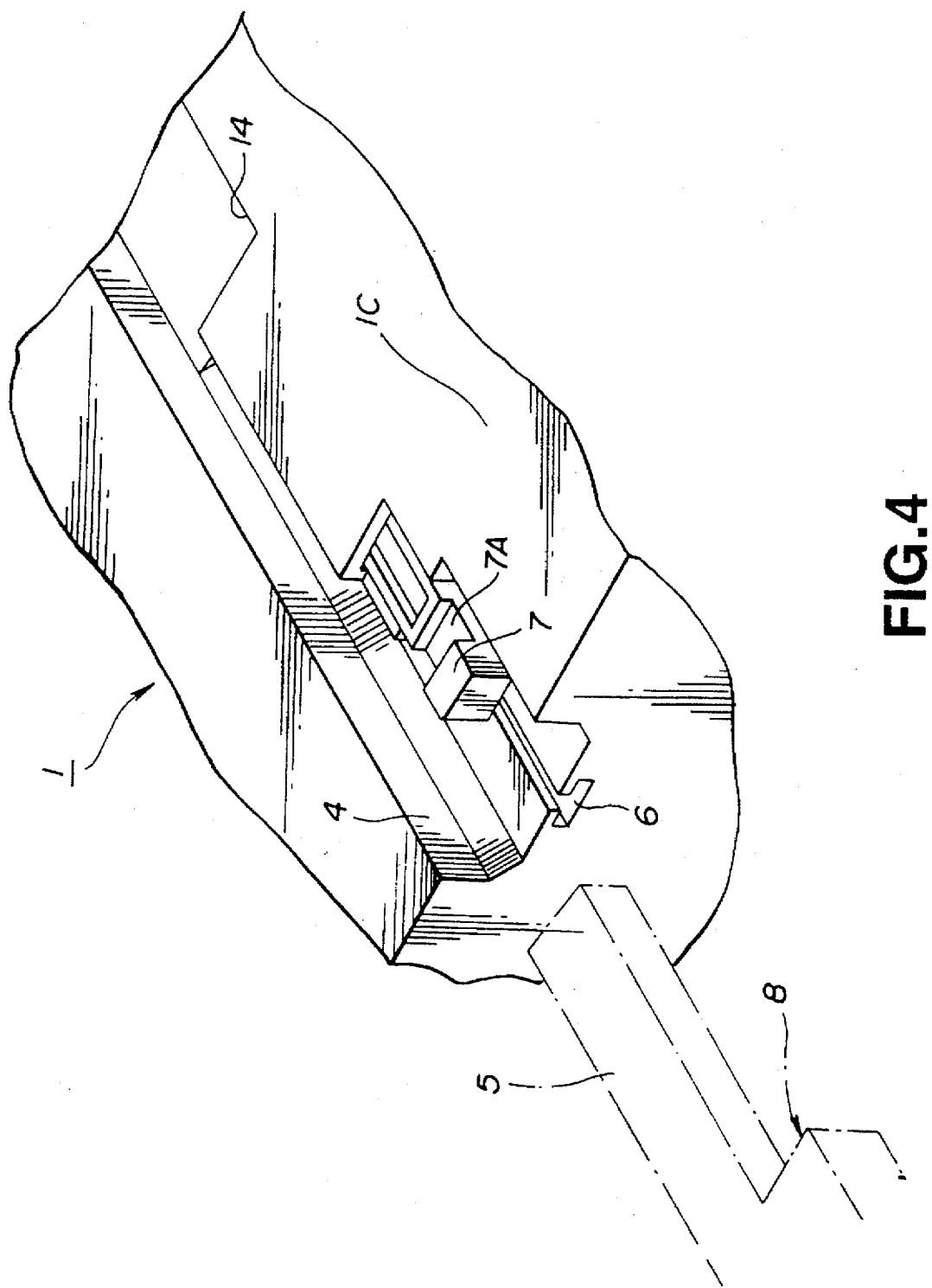
FIG. 4 is an enlarged perspective view showing essential portions of a loading surface section of the battery device shown in FIG. 1.
Figure 5:
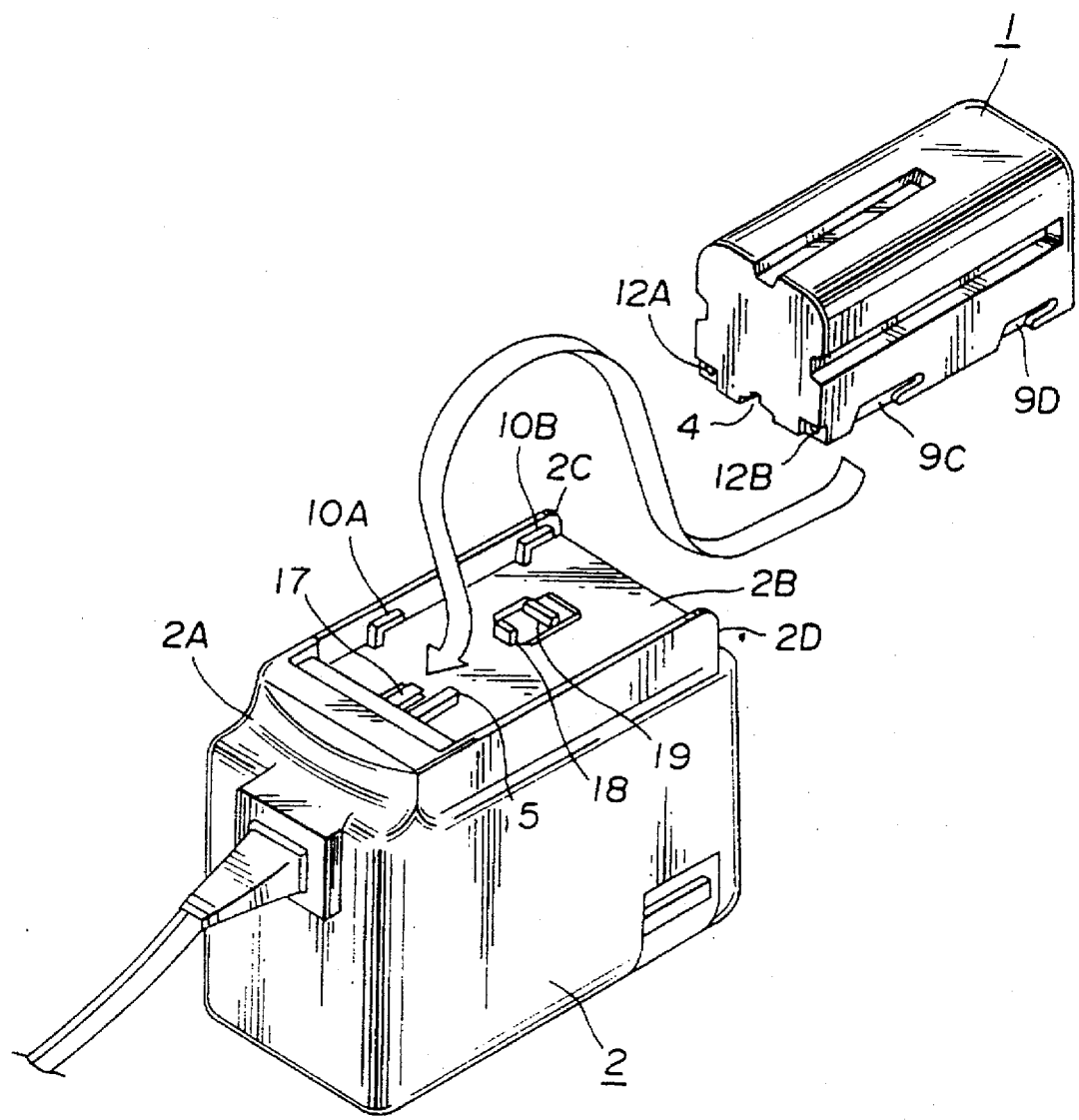
FIG. 5 is a perspective view showing the loading state of a main apparatus and a battery device according to the present invention.

A mounting recess 6 is formed in the loading surface section 1C in parallel with the discriminating recess 4, as shown in FIG. 4. In this mounting recess 6 is movably mounted a charging discriminating member 7. The charging discriminating member 7 is formed with a cut-out groove 7A opened in the loading surface section 1C. The cut-out recess is engaged by an engagement member, not shown, provided on the main apparatus, so as to permit the battery device 1 to be dismounted and pulled out of the main apparatus.

In the loading surface section 1C, a substantially square-shaped groove 14 is formed connecting to one end of the discrimination groove 4. In the loading surface section 1C, a substantially rectangular-shaped loading guide recess 15 is formed at a midportion of the surface section 1C in registration with the centerline of the groove 14. In the loading surface section 1C, a substantially rectangular loading and holding recess 16, is also formed at a position substantially coincident with the centerline of the guide recess 15.

Figure 3:
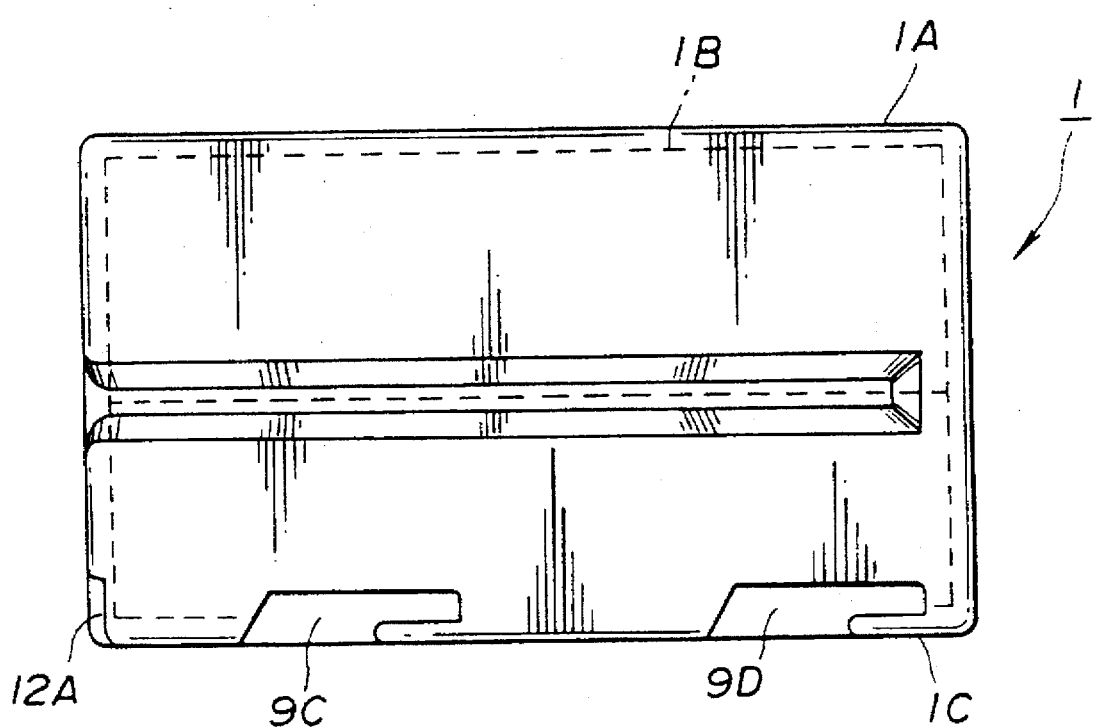
FIG. 3 is a side view showing the battery device shown in FIG. 1.

In a lateral side of the casing 1A extending at right angles to the loading surface 1C parallel to the loading direction, substantially L-shaped first and second guide recesses 9A and 9B are formed in series with each other so as to be opened at one ends at the loading surface section 1C, as shown in FIGS. 1 and 3. In the opposite lateral side of the casing 1A, a third guide recess 9C and a fourth guide recess 9D, are formed in series with each other in registration with the first and second guide recesses 9A and 9B, respectively.

The discrimination groove 4 formed in the loading surface section 1C is offset with respect to the centerline of the loading surface section 1C, and is longitudinally dimensioned so as to have a portion extending parallel to the first guide recess 9A and the second guide recess 9C. In other words, the beginning ends of the first and third guide recesses 9A and 9C are positioned closer to an abutment surface extending normal to the loading surface 1C than the terminal end of the discrimination groove 4.

With the above-described battery device 1 of the embodiment illustrated, since the discrimination groove 4 is offset to one side of the centerline of the loading surface section 1C, and the beginning ends of the first and third guide recesses 9A and 9C are positioned closer to the abutment surface normal to the loading surface 1C than the terminal end of the discrimination groove 4, the discrimination groove 4 can be positively discriminated by the main apparatus at the initial loading stage in which the first to fourth guide grooves 9A to 9D of the battery device 1 are caused to bear against the main apparatus. Thus it becomes possible to positively prohibit mistaken loading of the battery device 1 on the main apparatus as well as to prohibit destruction of the main apparatus.

Referring to FIGS. 5 to 12, 15 and 16, an illustrative embodiment of the loading device for the battery device according to the present invention is explained. The loading device 3 (See FIG. 9) for the battery device is constituted by the battery device 1 and the main apparatus 2 on which the battery device 1 is loaded. The battery device 1 is similar to that described above in reference to FIGS. 1 to 4.

The main apparatus 2 has a casing 2A having a setting surface section 2B on which the battery device 1 is loaded, and a main body of the apparatus having connection terminals 13A, 13B respectively abutted against and connected to the terminals 12A, 12B of the battery device 1.

Figure 6:
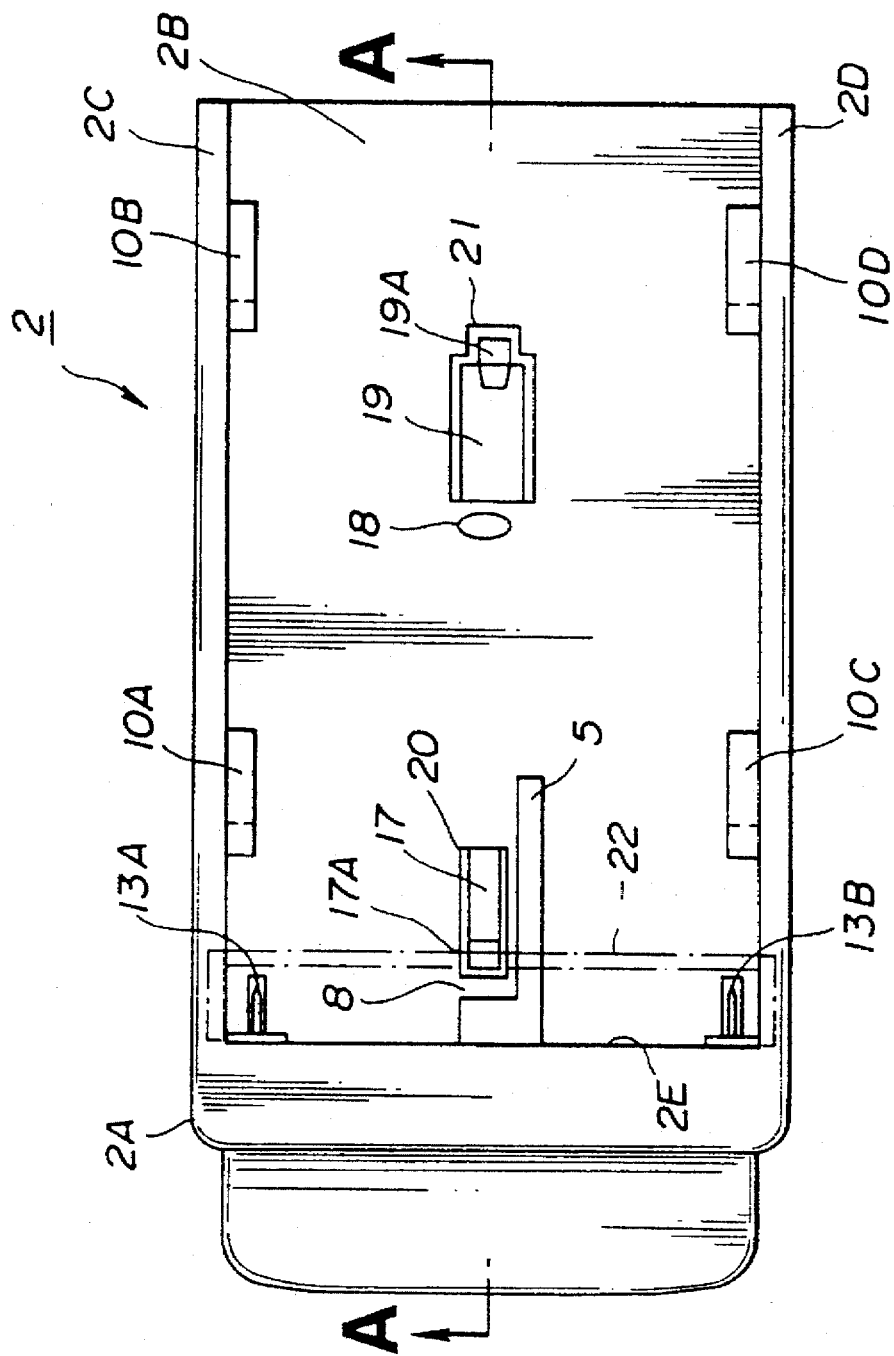
FIG. 6 is a plan view showing the main apparatus constituting the loading device for the battery device.
Figure 7:
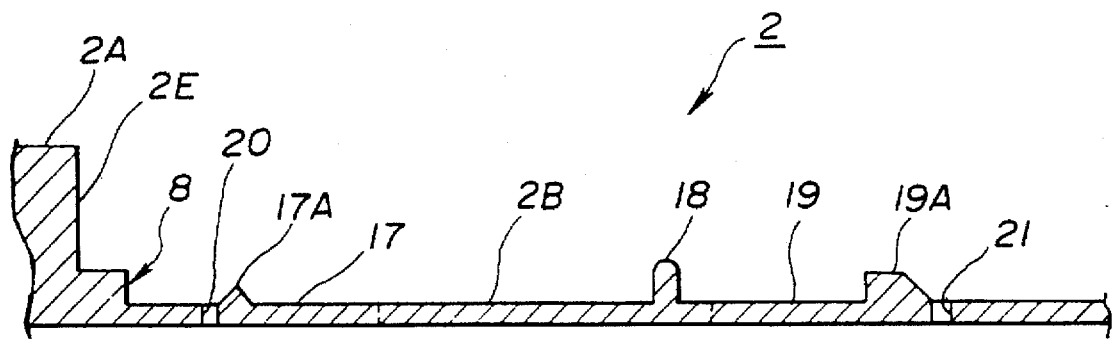
FIG. 7 is a longitudinal cross-sectional view taken along line A—A of FIG. 6.

The casing 2A is formed with a substantially L-shaped discrimination protrusion 5 having its one end secured to an abutment surface 2E extending at right angles to the setting surface section 2B, as shown in FIGS. 6 and 7. The discrimination protrusion 5 has its proximal end formed integrally with an actuating portion 8.

The setting surface section 2B has a substantially rectangular opening 20 from one lateral end of which is integrally protruded a substantially rectangular engagement portion 17. The engagement portion 17 is designed to be resiliently flexed about its proximal portion and has its proximal end formed integrally with an engagement lug 17A.

On the setting surface section 2B a loading guide 18 in the form of a pillar of an elliptical cross-section is protruded on a line of extension of the engagement portion 17. In the setting surface section 2B, a substantially rectangular opening 21 is formed having its centerline coincident with the loading guide 18. From a lateral side of the opening 21 is integrally protruded a substantially rectangular loading holding portion 19. The loading holding portion 19 is designed to be resiliently flexed about its proximal end as a fulcrum point and has its distal end formed integrally with a loading and holding lug 19A.

The casing 2A is integrally formed with a pair of guide wall sections 2C, 2D extending at right angles to the setting surface section 2B and parallel to the loading direction. On the inner wall surface of the guide wall section 2C are formed L-shaped first and second guide protrusions 10A and 10B in series with each other.

On the inner wall surface of the guide wall section 2D opposite to the inner wall section 2C carrying the first and second guide protrusions 10A, 10B, a third guide protrusion 10C and a fourth guide protrusion 10D are integrally formed facing the first and second guide protrusions 10A and 10B, respectively.

The setting surface section 2B has a discrimination protrusion 5 which is offset with respect to the centerline of the setting surface section 2B, and is longitudinally dimensioned so as to have a portion extending parallel to the first guide protrusion 10A and the second guide protrusion 10C. In other words, the beginning ends of the first and third guide protrusions 10A and 10C are positioned closer to the abutment surface 2E than the terminal end of the discrimination protrusion 5.

On both ends of the abutment surface 2B of the casing 2A, a first connection terminal 13A as a positive electrode and a second connection terminal 13B as a negative electrode are formed. The first connection terminal 13A and the second connection terminal 13B are connected to a dc conversion unit, not shown.

The first and second connection terminals 13A and 13B are protected by a protection member 22 having a substantially U-shaped cross-section. The protection member 22 is mounted for movement along the loading direction and is moved towards the abutment surface 2E by elastic deformation of an elastic member, not shown, for protruding the first connection terminal 13A and the second connection terminal 13B out of the protection member 22.

The operation of loading of the battery device 1 by the loading device 3 for the battery device, and of movement of the charging discrimination member 7 provided in the battery device 1, will now be explained. The first to fourth guide protrusions 10A to 10D formed on the inner wall sections of the guide wall sections 2C and 2D of the main apparatus 2 are caused to bear against the first to fourth guide recesses 9A to 9D formed on the lateral sides of the battery device 1 extending parallel to the loading direction, as shown in FIG. 8.

Figure 8:
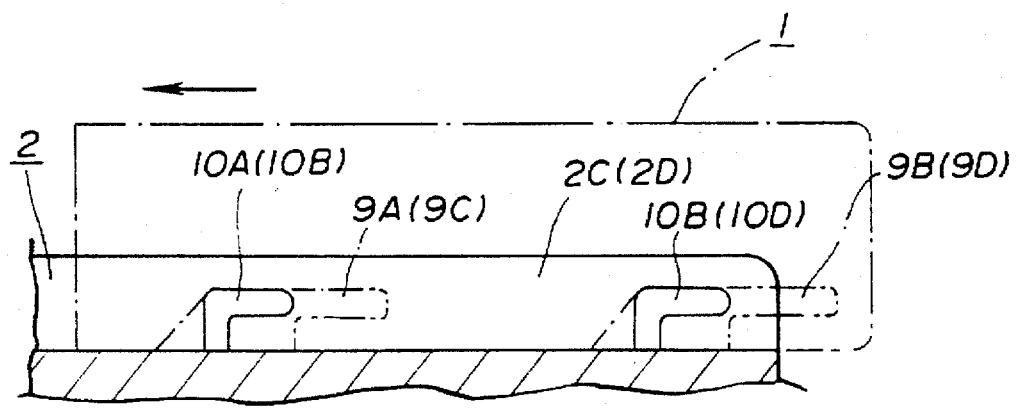
FIG. 8 is a partial longitudinal cross-sectional view showing the state in which the battery device is loaded on the main apparatus constituting the loading device for the battery device.

As the battery device 1 is moved along the loading direction as indicated by arrow in FIG. 8, the first to fourth guide protrusions 10A to 10D formed on the guide wall sections 2C and 2D of the main apparatus 2 are moved in the first to fourth guide recesses 9A to 9D of the battery device 1, respectively. The battery device 1 is retained by the main apparatus 2 by the guide protrusions being caused to bear against the ends of the first to fourth guide recesses 9A to 9D, respectively.

As the battery device 1 is moved along the loading direction, the loading guide 18 integrally formed in the setting surface section 2B of the main apparatus 2 is inserted into the loading guide recess 15 formed in the loading surface section 1C, so that the loading guide 18 is moved along the loading guide recess 15. The battery device 1 is retained by the main apparatus 2 by the loading guide 18 being caused to bear against the one end of the loading guide recess 15.

In addition, when the battery device 1 is moved along the loading direction, the loading and holding portion 19 protuberantly formed on the setting surface section 2B of the main apparatus 2 is resiliently flexed within the loading and holding recess 16 formed in the loading surface section 1C, so that the loading and holding lug 19A is engaged in the loading and holding recess 16 for retaining the battery device 1 on the main apparatus 2.

Also, when the battery device 1 is moved along the loading direction, the actuating portion 8 formed on the discrimination protrusion 5 of the main apparatus 2 is caused to bear against one end of the charging discriminating member 7 movably mounted in the mounting recess 6 of the loading surface section 1. Thus, when the battery device 1 is moved along the loading direction, the charging discriminating member 7 is thrust inward by the actuating portion 8.

When the battery device 1, thus loaded in position on the main apparatus 2, is pulled in an opposite direction to the loading direction, the loading and holding portion 19 is elastically flexed by one end of the loading and holding recess 16 for disengaging the loading and holding lug 19A from the loading and holding recess 16.

Also, when the battery device 1, thus loaded in position on the main apparatus 2, is pulled in a direction opposite to the loading direction, the engagement lug 17A protuberantly formed as one with the engagement portion 17 of the setting surface section 2B of the main apparatus 2 is engaged in the cut-out groove 7A formed in the charging discriminating member 7 movably mounted within the mounting recess 6 of the loading surface section 1C. Thus, when the battery device 1 is pulled in an opposite direction to the loading direction, the charging discrimination member 7 is pulled out by the engagement lug 17A.

Figure 9:
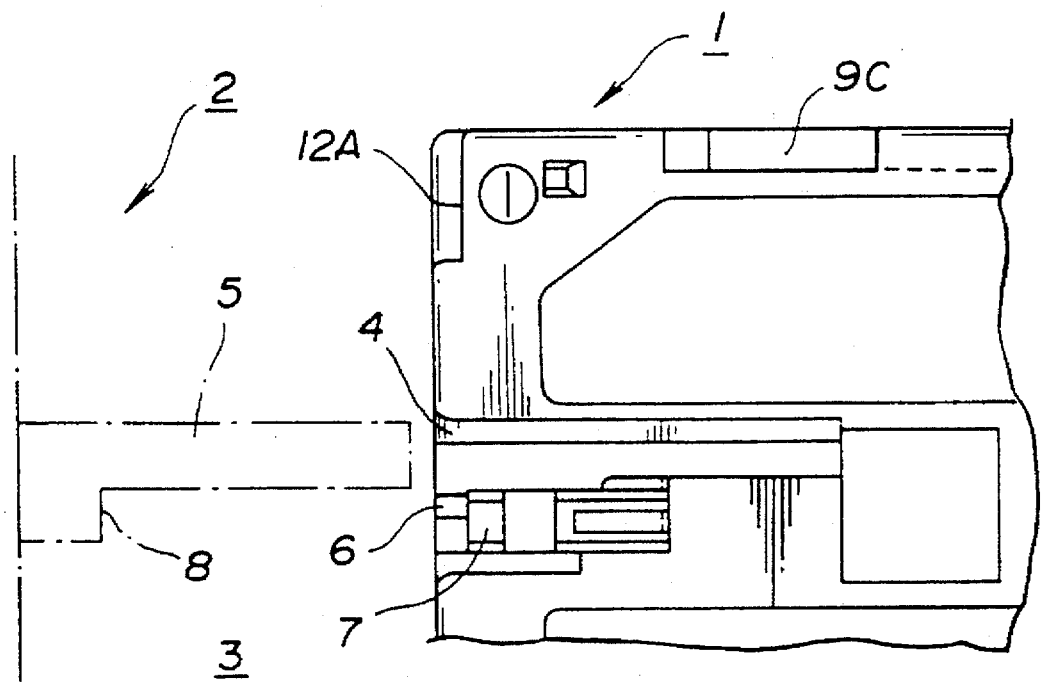
FIG. 9 is a schematic plan view showing the loading state of the battery device and the main apparatus constituting the loading device for the battery device.
Figure 10:
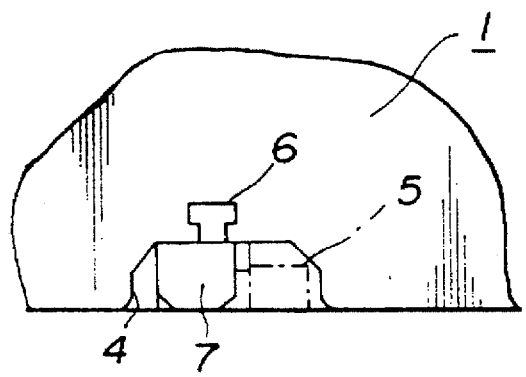
FIG. 10 is a schematic front view showing the loading state of the battery device and the main apparatus constituting the loading device for the battery device.

The operation of discriminating the battery device 1 by the main apparatus 2 is explained by referring to FIGS. 9 to 12. When the battery device 1 is loaded on the main apparatus 2, the discrimination protrusion 5 is inserted along the discrimination recess 4, as shown in FIGS. 9 and 10. By the insertion of the discrimination protrusion 5 into the discrimination groove 4, the main apparatus 2 discriminates the battery device 1 loaded thereon.

Figure 11:
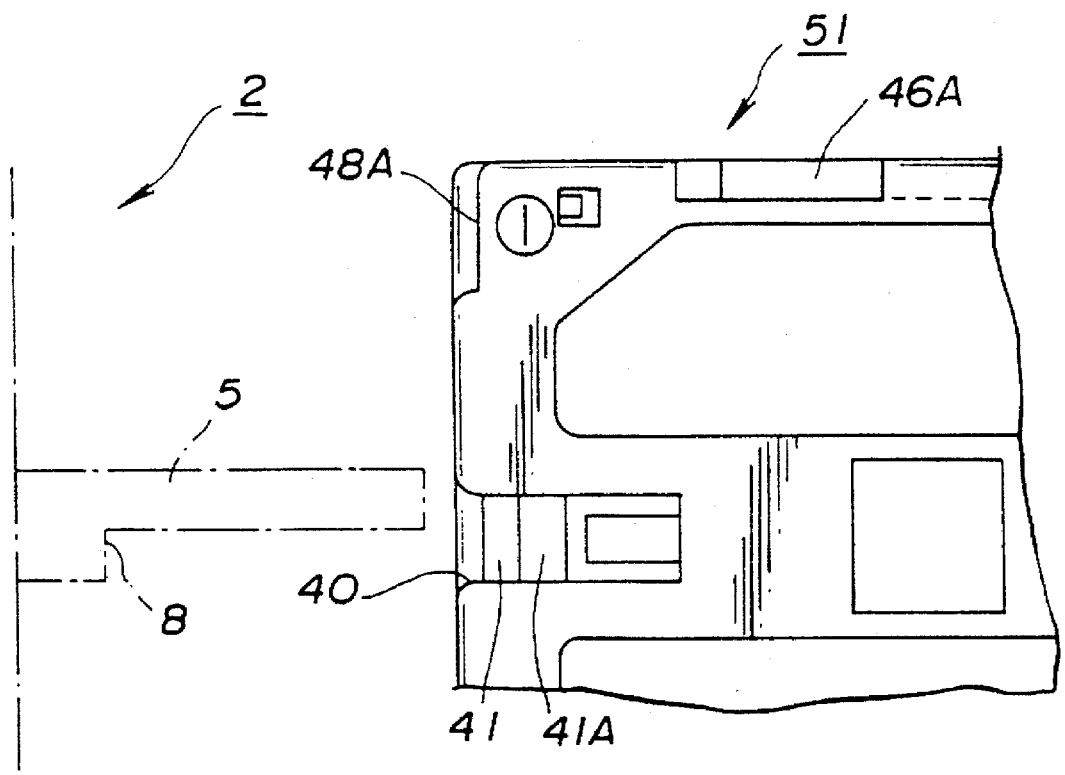
FIG. 11 is a schematic front view showing the loading state of the battery device and the main apparatus constituting the loading device for the battery device.
Figure 12:
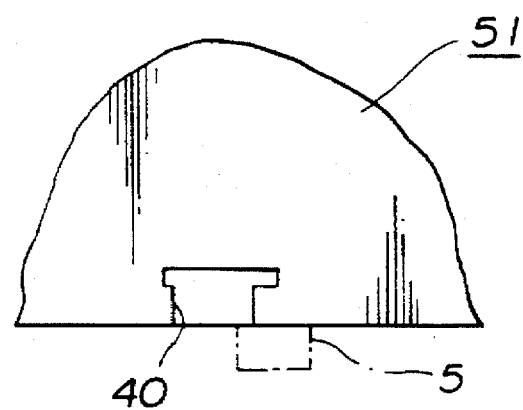
FIG. 12 is a schematic front view showing the loading state of the battery device and the main apparatus constituting the loading device for the battery device.
Figure 13:
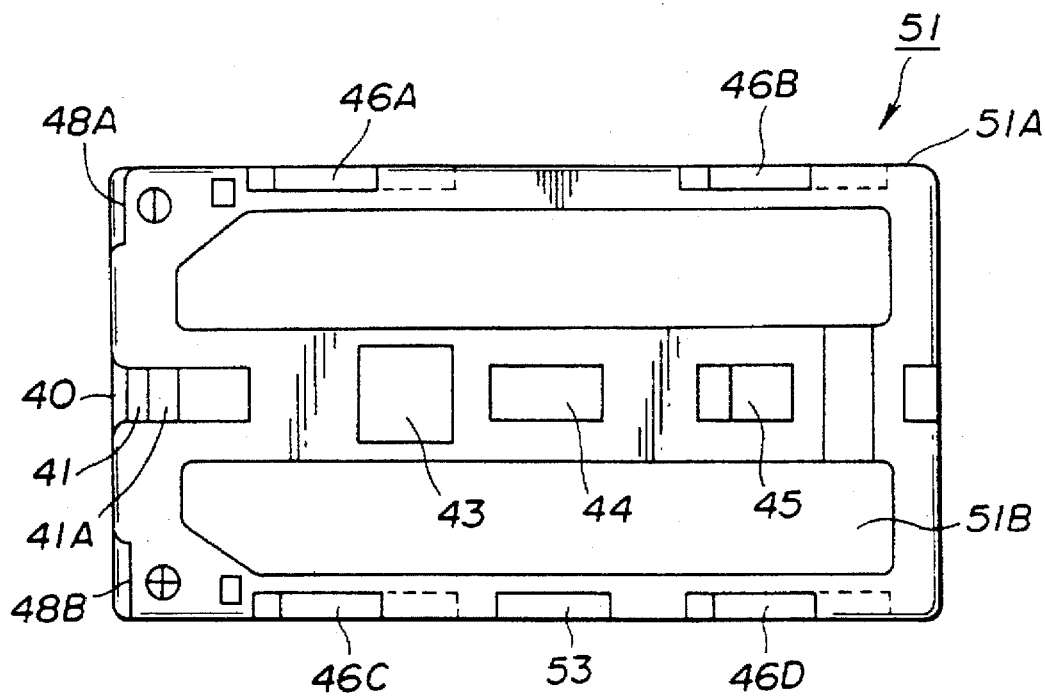
FIG. 13 is a plan view showing a conventional battery device.
Figure 14:
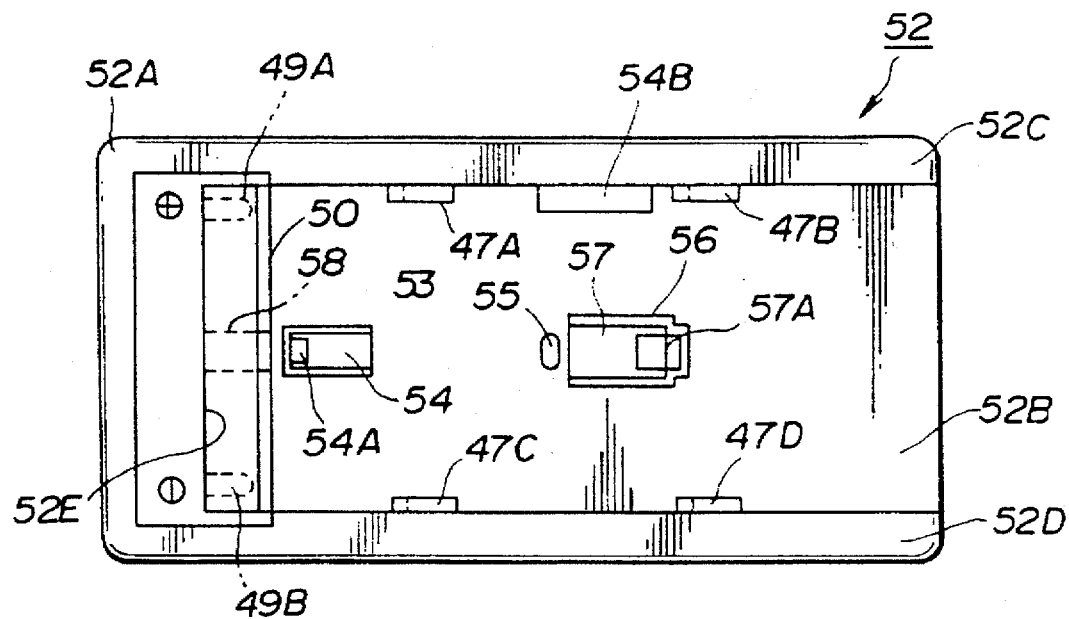
FIG. 14 is a plan view showing a main apparatus for loading a conventional battery device.
Figure 15:
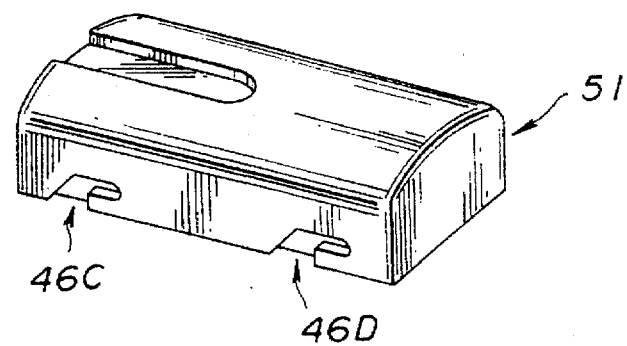
FIG. 15 is a perspective view of a battery device.

Since the discrimination protrusion 5 is formed on the main apparatus 2 at a position offset with respect to the centerline of the mounting recess 40 of the battery device 51, as shown in FIGS. 11 and 12, the main apparatus discriminates the battery device by the discrimination protrusion 5 being abutted against the loading surface section 51B of the battery device 51.

In the initial loading stage in which the first and fourth guide protrusions 10A and 10D of the main apparatus 2 are caused to bear against the first and fourth guide grooves 46A and 46D, the battery device 51 is tilted by abutment of the discrimination protrusion 5 against the loading surface section 51B. Thus the main apparatus recognizes the loading of an inappropriate battery device 51 based on the tilt of the battery device 51.

Figure 16:
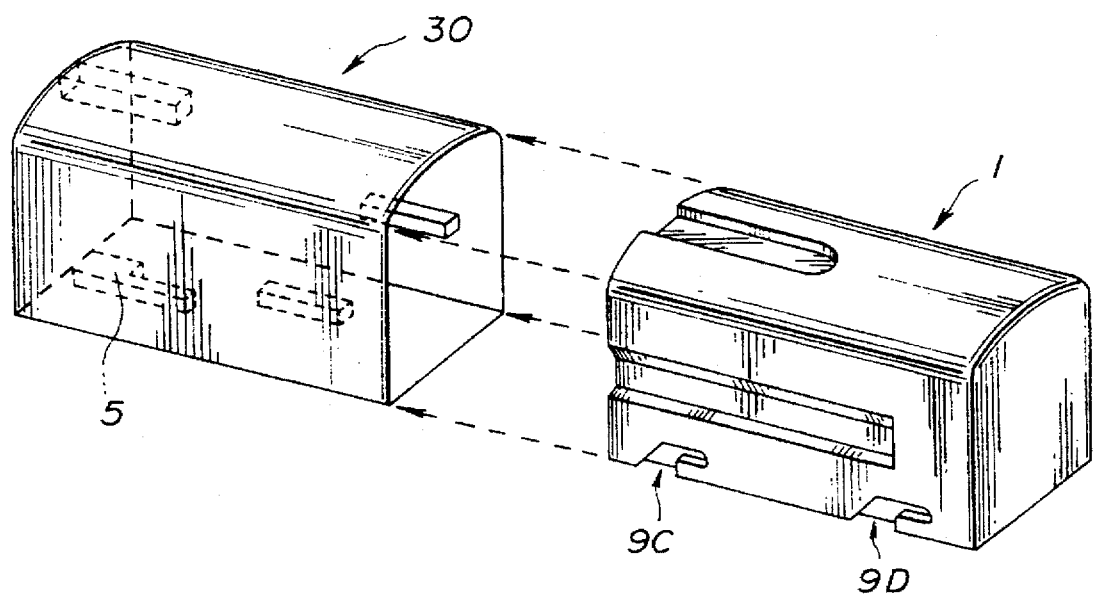
FIG. 16 is a perspective view of a battery device and a recess of an electronic apparatus in accordance with the invention.
Figure 17:
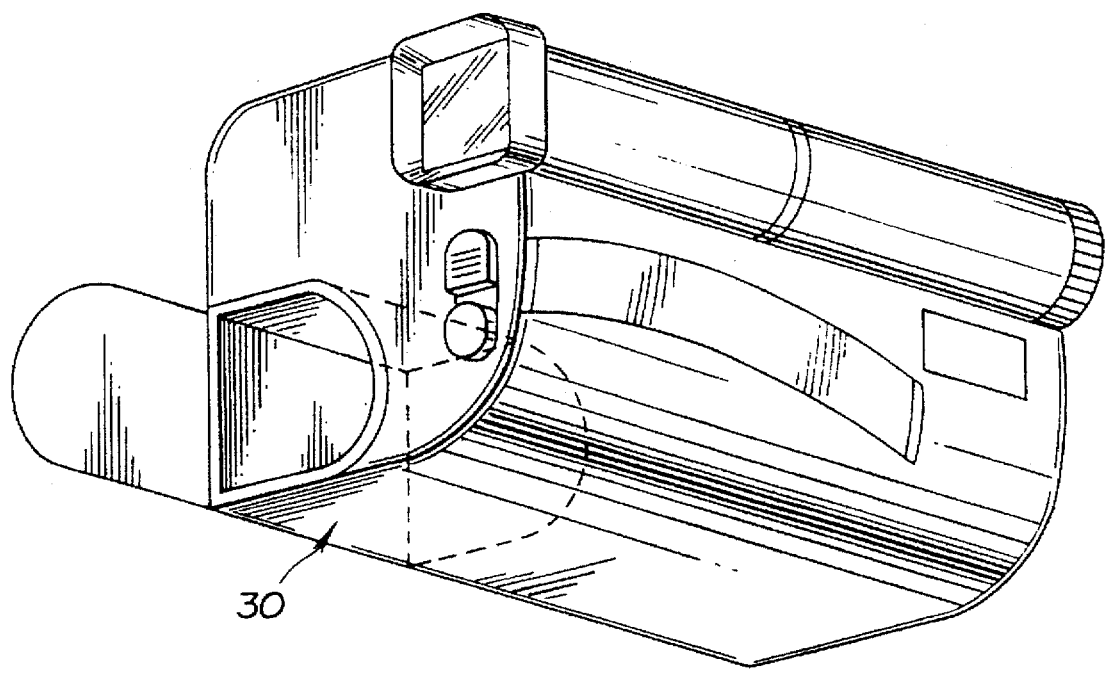
FIG. 17 is a top perspective view of an electronic apparatus in accordance with the invention.
Figure 18:
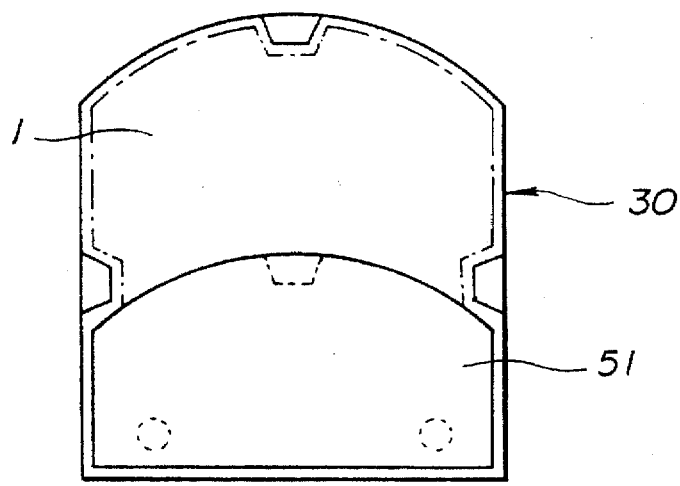
FIG. 18 is a plan view of a recess of an electronic apparatus, and a battery device according to the invention and a conventional battery device.

FIGS. 16 to 18 illustrate the operative relationship between a battery device 1 and electronic apparatus in accordance with the invention. In particular, FIG. 16 is a perspective view of a battery device 1 adapted to be inserted in a recess 30. As shown, a discrimination protrusion 5 is provided within the recess 30 in order to prevent insertion of an improper type of battery device. FIG. 17 is a top perspective view of an electronic apparatus in which such a recess 30 is provided. FIG. 18 shows a profile of a battery device 1 disposed in a recess 30, in comparison with a conventional battery device 51 (also shown in profile).

With the above-described loading device 3 for the battery device of the embodiment illustrated, the discrimination groove 4 is formed with an offset with respect to the centerline of the loading surface section 1C of the battery device 1, and the beginning ends of the first and second guide recesses 9A and 9C are located so as to be closer to the abutment surface normal to the loading surface section 1C than the terminal end of the discrimination groove 4, while the discrimination protrusion 5 is formed at a position offset with respect to the centerline of the setting surface section 2B of the main apparatus 2, and the beginning ends of the first and third guide protrusions 10A and 10C are located so as to be closer to the abutment surface 2E than the terminal ends of the discrimination protrusion 5.

Thus, with the loading device 3 for the battery device, the discrimination protrusion 5 is inserted into the discrimination recess 4 in the initial loading position in which the first to fourth guide protrusions 10A to 10D formed on the main apparatus 2 are abutted against the first to fourth guide recesses 9A to 9D formed in the battery device 1.

Thus it is possible with the loading device 3 for the battery device to positively and clearly discriminate the battery device 51 by the discrimination protrusion 5, before completion of the loading of the battery device 51 on the main apparatus 2, thereby enabling rejection of loading of the battery device 51.

With the loading device for the battery device according to the present invention, the main apparatus on which the battery device is loaded is a charger for electrically charging the battery device. However, the main apparatus may also be constituted in the casing of an electronic apparatus, such as a portable video camera device, instead of being the charger.

With the above-described battery device according to the present invention, since the discrimination groove is formed at a position offset relative to the centerline of the loading surface section, and the beginning end of the guide recess is located so as to be closer to the abutment surface than the terminal end of the discrimination groove, and hence the discrimination groove can be positively and clearly discriminated by the main apparatus in the initial loading state in which the guide recess in the battery device is abutted against the main apparatus. It therefore becomes possible to positively prevent mistaken loading and consequent destruction of the main apparatus.

In addition, with the above-described loading device for the battery device according to the present invention, the discrimination groove is formed with an offset with respect to the centerline of the loading surface section of the battery device, and the beginning ends of the first and second guide recesses are located so as to be closer to the abutment surface normal to the loading surface section than the terminal ends of the discrimination groove, while the discrimination protrusion is formed at a position offset with respect to the centerline of the setting surface section of the main apparatus, and the beginning ends of the first and third guide protrusions are located so as to be closer to the abutment surface than the terminal ends of the discrimination protrusion. Thus, the battery device can be discriminated clearly and positively by the discrimination protrusion in the initial loading state of the battery device on the main apparatus. Thus, it becomes possible to prohibit loading of the inappropriate battery device and consequent destruction of the main apparatus.

What is claimed:

1. A battery device comprising:

a casing having;

a battery housing unit disposed therein, a loading surface on a lateral surface of an outer periphery of said casing, and an abutment surface on a lateral surface of the outer periphery of said casing which faces a loading direction of said battery device; and at least one battery housed within said battery housing unit in said casing;

wherein said loading surface of the casing has a groove for discriminating whether the battery device is compatible with electronic equipment to which it may be connected;

said groove having a first end open on said abutment surface and extending from said first end in a direction parallel to said loading direction;

wherein said groove is located at a position offset relative to a centerline of the loading surface.

2. The battery device as claimed in claim 1 wherein the battery housing unit is formed by a space enclosed by an inner wall section for holding a plurality of batteries and said groove being formed in the loading surface in a thickened portion of the inner wall section.

3. A battery device comprising:

a casing having;

a battery housing unit disposed therein, a loading surface on a lateral surface of an outer periphery of said casing, an abutment surface on a lateral surface of the outer periphery of said casing which faces a loading direction of said battery device; and at least one battery housed within said battery housing unit in said casing;

wherein said loading surface of the casing has a groove for discriminating whether the battery device is compatible with electronic equipment to which it may be connected;

wherein said groove has a first end open on said abutment surface and extends from said first end in a direction parallel to said loading direction;

wherein said loading surface of said casing has at least a pair of guide recesses which are formed therein; and wherein said groove has a second end opposite said first end and at least a portion of each of said guide recesses is closer to said abutment surface than said second end of said groove.

4. The battery device as claimed in claim 1 wherein said casing has terminals on both ends of said abutment surface, said terminals being connected to the at least one battery housed within the battery housing unit.

5. A battery mounting system for a battery device comprising:

a battery device having;

a battery device casing, a battery housing unit in said battery device casing, a loading surface on a lateral surface of an outer periphery of said battery device casing, an abutment surface on a lateral surface of the outer periphery of said battery device casing which faces a loading direction of said battery device, and a battery housed within said battery housing unit, wherein said loading surface has a groove having an end opened on said abutment surface and extending from said opened end parallel to the loading direction on the main apparatus, and a main apparatus having;

an apparatus casing, a setting surface on a lateral side of an outer periphery of said apparatus casing for loading the loading surface of said battery device thereon, an abutment surface adjacent to said setting surface, a discriminating protrusion secured at a first end thereof to said abutment surface and formed on the setting surface, wherein if said discriminating protrusion and said groove mate, the battery device is determined to be compatible with the main apparatus.

6. The system as claimed in claim 5 wherein:

the battery device has at least a pair of guide recesses in said loading surface;

said main apparatus has at least a pair of guide protrusions formed on said setting surface for mating with said guide recesses on said loading surface;

said groove is offset with respect to a centerline of the loading surface;

at least a portion of said recesses is closer to said abutment surface of said battery device than an end of said groove which is opposite said opened end of said groove;

said discriminating protrusion is formed at an offset position with respect to a centerline of said setting surface;

a second end of said discriminating protrusion is further from the abutment surface of said main apparatus than at least a portion of said guide protrusions; and in the initial loading state in which the guide protrusions provided on the main apparatus are inserted into the guide recesses formed in the battery device, the discriminating protrusion is inserted into the groove during the loading of the battery device in the main apparatus.

7. The system as claimed in claims 5 or 6 further comprising:

a charge discrimination member movably mounted on said loading surface of said battery device for indicating whether the battery is charged; and an actuating portion provided on said setting surface of said main apparatus for moving the charge discrimination member.

8. The system as claimed in claim 7 wherein:

the charge discrimination member has a cut-out groove facing the setting surface of the main apparatus;

the main apparatus includes an engagement protrusion which can be engaged in said cut-out groove formed in the charge discrimination member in alignment with said actuating portion; and the engagement protrusion is engaged in the cut-out groove when the loading surface of the battery device is removed from contact with the setting surface of the main apparatus for moving the charge discrimination member.

9. A battery device comprising:

a casing having;

a battery housing unit disposed therein, a loading surface on a lateral surface of an outer periphery of said casing, and an abutment surface on a lateral surface of the outer periphery of said casing which faces a loading direction of said battery device;

at least one battery housed within said battery housing unit in said casing; and a charge discrimination member which is movably mounted on said loading surface for indicating that the battery is charged or not charged;

wherein said loading surface of the casing has a groove for discriminating whether the battery device is compatible with electronic equipment to which it may be connected;

said groove having a first end open on said abutment surface and extending from said first end in a direction parallel to said loading direction.

10. The system as claimed in claim 5 wherein;

said groove is offset with respect to a centerline of said loading surface, and said discriminating protrusion is correspondingly offset with respect to a centerline of said setting surface.

* * * * *